United States Patent [19]

Yamada et al.

[11] Patent Number: 5,207,003
[45] Date of Patent: May 4, 1993

[54] TARGET AND SYSTEM FOR THREE-DIMENSIONALLY MEASURING POSITION AND ATTITUDE USING SAID TARGET

[75] Inventors: Naoshi Yamada; Tomoaki Takeya, both of Hyogo, Japan

[73] Assignee: Mitsubishi Denki Kabushiki Kaisha, Tokyo, Japan

[21] Appl. No.: 673,195

[22] Filed: Mar. 21, 1991

[30] Foreign Application Priority Data

Mar. 29, 1990 [JP] Japan .................................. 2-86123

[51] Int. Cl.[5] .............................................. G01C 15/02
[52] U.S. Cl. ........................................ 33/293; 33/286; 356/153
[58] Field of Search .................... 350/102, 103, 104; 356/152, 153, 400; 362/346, 347, 350, 259; 33/293, 297, 298, 286, DIG. 21; 359/530, 534, 535

[56] References Cited

U.S. PATENT DOCUMENTS

| | | | |
|---|---|---|---|
| 2,559,799 | 7/1951 | Rinia et al. | 356/153 |
| 2,904,890 | 9/1959 | Vajda | 33/293 |
| 3,778,169 | 12/1973 | Adams | 33/293 |
| 3,894,804 | 7/1975 | Detwiler et al. | 356/153 |
| 4,650,325 | 3/1987 | Crowder | 356/152 |
| 4,684,247 | 8/1987 | Hammill | 356/152 |
| 4,721,386 | 1/1988 | Collyer | 356/152 |
| 4,964,218 | 10/1990 | Morghen | 33/293 |
| 5,020,876 | 6/1991 | Howard et al. | 350/102 |

FOREIGN PATENT DOCUMENTS

| | | | |
|---|---|---|---|
| 520300 | 2/1931 | Fed. Rep. of Germany | 350/104 |
| 278308 | 11/1927 | United Kingdom | 350/104 |
| 362649 | 12/1931 | United Kingdom | 350/104 |

OTHER PUBLICATIONS

Thesis entitled "A Few Considerations on Inverse Transformation Associated with Perspective Transformation" by Shimazaki (no date), (no tranlation).

Thesis entitled "Application to Three-Dimensional Position/Attitude Sensors and Robots" by Ishii, et al. Dec. 1984 (no translation).

Kazuo Machida et al., "Prototype of Short Range Sensor for Proximity Operation in Space," Proceedings of the Second Space Artificial-Intelligence/Robotics-/Automation Symposium, Nov. 17-18, 1988 at National Aerospace Laboratory (no translation).

*Primary Examiner*—William A. Cuchlinski, Jr.
*Assistant Examiner*—Alvin Wirthlin

[57] ABSTRACT

A target employable for three-dimensionally measuring a position and an attitude occupied by an object such as a space craft or the like while the target is attached to the object as well as a system for enabling the object to be three-dimensionally measured from a measuring point remote from the object by using the target are disclosed. The target includes a mark for indicating positions of four or more different points on a single common plane and a spherical reflector of which the center of curvature is located remote from the common plane. In addition, the system includes means for irradiating a light toward the target, image building means for building an image representing the target, image photographing means for photographing the image representing the target, means for extracting from the image representing the target an image portion representing the mark corresponding to the target and image portions each representing a bright point formed by the spherical reflector, means for detecting a coordinate value corresponding to the center of gravity of the image portion representing the mark and coordinate values corresponding to the gravity centers of the image portions each representing the bright point, and means for determining in three dimensions the position and the attitude occupied by the object via a series of calculations based on the aforementioned coordinate values.

42 Claims, 9 Drawing Sheets

TARGET AND SYSTEM FOR THREE-DIMENSIONALLY MEASURING POSITION AND ATTITUDE USING SAID TARGET

BACKGROUND OF THE INVENTION

1. Field of the Invention

The present invention relates to a target employable for three-dimensionally measuring a position and an attitude occupied by an object such as a space craft or the like relative to a space station or other space craft when the first-mentioned space craft performs a docking operation with a space station or with another space craft.

Further, the present invention relates to a system for enabling a position and an attitude occupied by an object such as a space craft or the like to be three-dimensionally measured from a measuring point remote from the object by using the aforementioned target.

2. Description of the Related Art

To facilitate understanding of the present invention, a conventional target and a conventional system of the aforementioned type will be briefly described below with reference to FIGS. 9-11.

Figure 9:
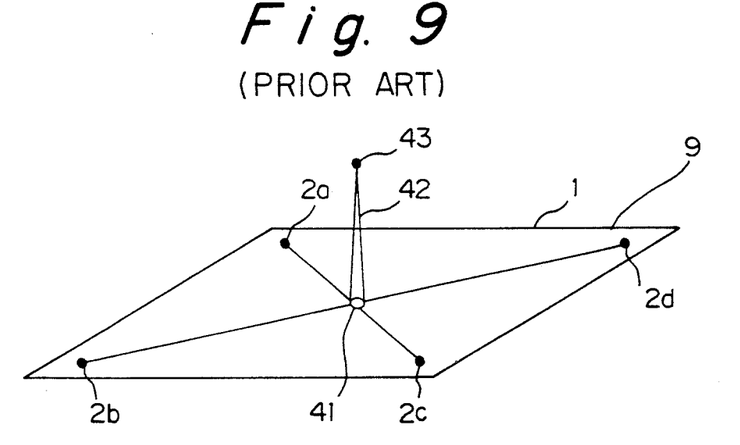
FIG. 9 is a perspective view which schematically shows the structure of a conventional target.

FIG. 9 is a perspective view which schematically shows the structure of a conventional target employable for three-dimensionally measuring a position and an attitude occupied by an object such as a space craft or the like wherein the conventional target has been disclosed in pages 51-54, B1-3, 1988, Symposium on Artificial Intelligence, Robotics and Automation in Space Application. FIG. 10 is an illustrative view which schematically shows the structure of a conventional system for three-dimensionally measuring a position and attitude of an object such as a space craft or the like wherein the conventional system has been disclosed in the same symposium as mentioned above.

In FIG. 9, reference numeral 1 designates a plane plate, reference numerals 2a, 2b, 2c and 2d designate a plurality of marks which are arranged on the plane plate 1 while exhibiting a rectangular shape, respectively, reference numeral 41 designates an intersection where two diagonal lines extending between the marks 2a, 2b, 2c and 2d intersect each other, reference numeral 42 designates a pole which is upright in relation to the intersection 41 on the plane plate 1, and reference numeral 43 designates a mark which is fixedly mounted on the top of the pole 42. A target 9 employable for three-dimensionally measuring a position and attitude of an object such as a space craft or the like is constituted by the above-described components.

Figure 10:
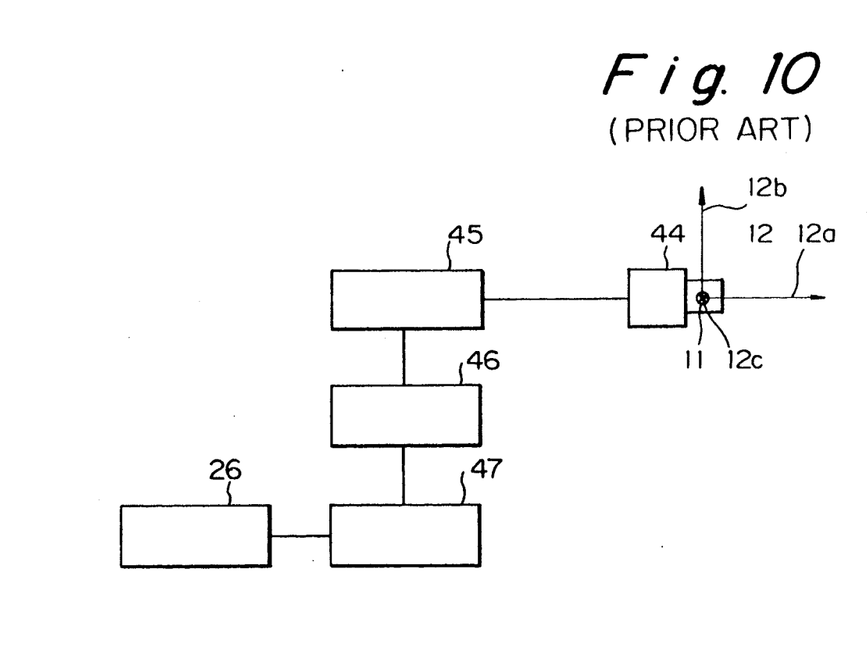
FIG. 10 is an illustrative view which schematically shows the structure of a conventional system of the foregoing type.

Next, in FIG. 10, reference numeral 8 designates an object to be measured, reference numeral 9 designates a target attached to the object 9 for enabling three-dimensional measurement of a position and attitude occupied by the object 8, reference numerals 10a, 10b and 10c designate a coordinate axis in an imaginary target coordinate system which is arranged on the target 9, respectively, reference numeral 11 designates a measuring point, reference numeral 12 designates an imaginary reference coordinate system which is arranged on the measuring point 11, reference numerals 12a, 12b and 12c designate a coordinate axis which constitutes the reference coordinate system 12, respectively, reference numeral 44 designates a TV camera which is installed on the measuring point 11, reference numeral 45 designates a synchronizing signal separating circuit for separating a synchronizing signal from an output from the TV camera 44, reference numeral 46 designates a counter circuit for allowing each output from the synchronizing signal separating circuit 45 to be input thereinto, reference numeral 47 designates a buffer memory in which an output from the counter circuit 46 is temporarily stored, and reference numeral 26 designates a calculating/processing circuit which performs a calculating/processing operation in accordance with the program which has been previously determined with reference to the content of items stored in the buffer memory 47.

Next, an operation of the conventional system constructed in the aforementioned manner will be described below.

Figure 11:
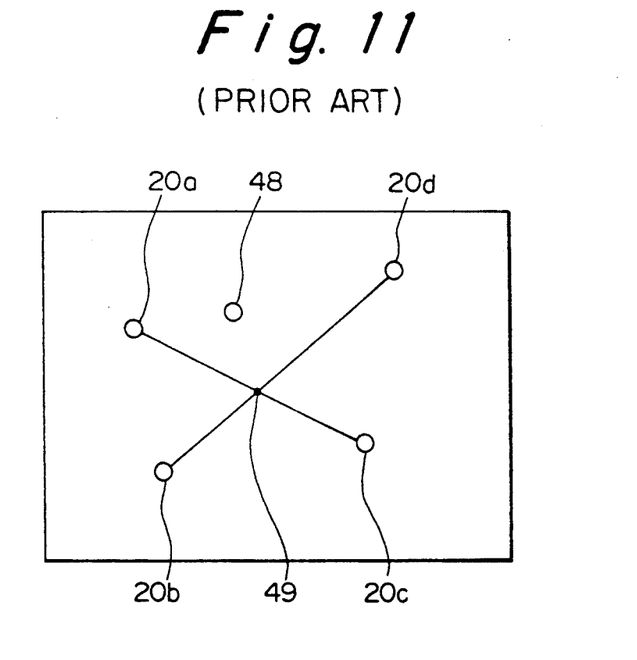
FIG. 11 is an illustrative view which schematically shows an operation of the conventional system as shown in FIG. 10.

When the target 9 attached to the object 8 is visually recognized from the measuring point 11 via the TV camera 44, an image as shown in FIG. 11 can be obtained.

In FIG. 11, reference numeral 20a designates an image portion corresponding to the mark 2a on the plane plate 1, reference numeral 20b designates an image portion corresponding to the mark 2b on the plane plate 1, reference numeral 20c designates an image portion corresponding to the mark 2c on the plane plate 1, reference numeral 20d designates an image portion corresponding to the mark 2d on the plane plate 1, reference numeral 48 designates an image portion corresponding to the mark 43 and reference numeral 49 designates a point corresponding to the intersection 41.

When an output from the TV camera 44 is input into the synchronizing signal separating circuit 45, an image signal is separated from the synchronizing signal. In response to the image signal, a mark detecting circuit (not shown) detects points each having a high degree of brightness, i.e., the image portions 20a, 20b, 20c and 20d which represent the marks 2a, 2b, 2c and 2d on the plane plate 1. Then, the counter circuit 46 calculates a position of each of the detected image portions 20a, 20b, 20c and 20d in the image as shown in FIG. 11 by utilizing the synchronizing signals which have been generated in the synchronizing signal separating circuit 45.

Next, a principle for operating the conventional system will be described below.

Each synchronizing signal generated in the synchronizing signal separating circuit 45 is composed of a vertical synchronizing signal and a horizontal synchronizing signal. With such a construction, the position occupied by each detected mark in the image as seen in the horizontal direction can be calculated by counting the time which has elapsed from receipt of the horizontal synchronizing signals in the counter circuit 46. On the other hand, the position of each detected mark as seen in the vertical direction can likewise be calculated by counting the number of horizontal synchronizing signals which have been received by the counter circuit 46 in synchronization with the vertical synchronizing signals. Values derived from counting operations performed in the counter circuit 46 are stored in the buffer memory 47. As is apparent from FIG. 10, the calculating/processing circuit 26 is arranged upstream of the buffer memory 47 so as to have access to the buffer memory 47. Now, the position and the attitude occupied by the object 8 can be calculated in three dimensions in accordance with the software which has been previously programmed by using values derived from the foregoing access.

Next, a principle for three-dimensionally measuring the position and the attitude occupied by the object 8 relative to the measuring point 11 with reference to the image in FIG. 11 which has been visually recognized by the TV camera 44 will be described below.

The position and the attitude of the object 8 relative to the measuring point 11 can be determined by three components representing the positions of three coordinate axes 10a, 10b, 10c and 10d in the target coordinate system relative to the reference coordinate system 12 and three components representing the attitude angles of the same.

Generally, in a case where the geometrical positional relationship among four points on a single common plane in the three-dimensional space is previously known, it has been clarified that the three-dimensional positions corresponding to the four points can definitely be determined by an inverse perspective transformation process (refer to a thesis titled "A few considerations on inverse transformation associated with perspective transformation" by Shimazaki in the articles collected by Image Engineering Division of Japanese Electronic Communication Society, 79-15, 1979). In addition, a system for three-dimensionally measuring a position and an attitude occupied by an object based on the aforementioned principle while four marks arranged on the apex of a rectangular form are assumed as a target, respectively, has already been reported (refer to a thesis title "Application to three-dimensional position/attitude sensors and robots" by Ishii et al. in the articles collected by Japanese Measurement and Automatic Control Society, Vol. 21, No. 4, 1985).

As is apparent from the reference to the above-cited thesis, with the conventional system constructed in the above-described manner, the position and the attitude occupied by the axes 10a, 10b and 10c in the target coordinate system relative to the reference coordinate system 12 can be determined and the position and the attitude occupied by an object to be measured can be three-dimensionally measured by calculating the gravity centers corresponding to the image portions 20a, 20b, 20c and 20d in the image as shown in FIG. 11. This is because the image portions 20a, 20b, 20c and 20d in the image representing the target 9 which has been visually recognized by the TV camera 44 in the reference coordinate system 12 correspond to points derived from perspective transformation of the marks 2a, 2b, 2c and 2d on the plane plate 1. Further, since a length of the image portion 48 corresponding to the mark 43 mounted on the apex of the pole 42 and a length of the image portion representing the point 49 in correspondence to the intersection 41 vary with an excellent sensibility in response to variation of the attitude angle of the object 8, the conventional system can measure the attitude angle of the object 8 with a high degree of accuracy by utilizing the aforementioned properties of the conventional system.

However, since the conventional target is constructed in the above-described manner, a length of the pole 42 must be elongated in order to measure the attitude angle of the object 8 with improved accuracy. This leads to a problem that a measuring operation cannot practically be performed because the mark may be hidden due to extension of the pole 42 or the pole 42 may collide with another space craft when a docking operation is being performed. On the contrary, when the length of the pole 42 is reduced so as to obviate the aforementioned problem, there arises another problem that the attitude angle of the object 8 cannot be measured with a sufficiently high degree of accuracy.

SUMMARY OF THE INVENTION

The present invention has been made with the foregoing background in mind.

An object of the present invention is to provide a target which assures that an attitude angle occupied by an object such as a space craft or the like can be measured with a high degree of accuracy without any danger of an object projecting from the target such as a pole or the like colliding with space craft when a docking operation is to be performed with a space station or another space craft.

Another object of the present invention is to provide a system for three-dimensionally measuring a position and an attitude occupied by an object such as a space craft or the like wherein the system may be preferably employed for the aforementioned target.

To accomplish the former object, there is provided according to one aspect of the present invention a target for use in three-dimensionally measuring a position and an attitude occupied by an object such as a space craft or the like with the target being attached to the object so as to enable the object to be measured, wherein the target includes a mark for indicating positions of four or more different points on a single common plane and a spherical reflector of which the center of curvature is located at a position remote from the common plane.

Further, to accomplish the latter object, there is provided with other embodiment of the present invention a system for enabling a position and an attitude occupied by an object such as a space craft or the like to be three-dimensionally measured from a measuring point remote from the object, wherein the system comprises a mark for indicating four or more different points on a single common plane, a target including a spherical reflector of which the center of curvature is located remote from the common plane, means for irradiating a light toward the target, image building means for building an image representing the target, image photographing means for photographing the image representing the target, means for extracting from the image representing the target an image portion representing the mark and image portions each representing a bright point formed by the spherical reflector, means for detecting a coordinate value corresponding to the center of gravity of the image portion representing the mark and a coordinate value corresponding to the center of gravity of the image portions each representing a bright point, and calculating means for determining in three dimensions the position and the attitude occupied by the object via a series of calculations based on the aforementioned coordinate values.

The target of the present invention includes a mark indicating the positions of four or more points on a single common plane and a spherical reflector having a spherical reflective surface. The spherical reflector is arranged such that its center of curvature is not located at a position on the common plane which has been defined by the mark. It should be noted that the common plane which has been repeatedly referred to in this specification includes an imaginary plane.

In addition, with the system of the present invention, the target is attached to the object to be measured and a light is irradiated toward the target to form a plurality of bright points on the mark and the spherical reflector, whereby an image representing the target is built up. Then, image portions each having a high degree of brightness are detected with reference to the resultant image and the center of gravity of each of the image portions is determined based on the results derived from the foregoing detection. With respect to each image portion in the image, positions as seen in the horizontal direction and positions as seen in the vertical direction are calculated and the position and attitude of the object are then three-dimensionally measured on the basis of the values derived from a series of calculations.

As described above, according to the present invention, the target is composed of a mark indicating four or more points on a single common plane and a spherical reflector of which the center of curvature is not located on the common plane. The target of the present invention makes it possible to detect only the light passing past the center of curvature of the spherical reflector, causing the position of the center of curvature to serve as a positional index. Thus, this construction is equivalent to a case in which each positional index is three-dimensionally arranged. Consequently, in contrast with the conventional target, there is no need to arrange a projection which may prevent a measuring operation and a docking operation from being properly performed.

Additionally, since the system of the present invention includes means for irradiating a light toward the object, e.g., a light source, arrangement of the light irradiating means makes it possible to generate bright points each having a high degree of brightness in the presence of the spherical mirror. Consequently, with the system of the present invention, it is easy to separate the mark and the bright points from the background.

Other objects, advantages and features of the present invention will become apparent from reading the following description in conjunction with the accompanying drawings.

BRIEF DESCRIPTION OF THE DRAWINGS

The present invention is illustrated in the following drawings in which:

FIGS. 1(a) and 1(b) show a target in accordance with an embodiment of the present invention, respectively, wherein

FIGS. 2(a) and 2(b) show arrangement of a mark representing the target and a spherical reflector on the target, respectively, wherein

FIGS. 5–8 show the structure of a target in accordance with another embodiment of the present invention, respectively, wherein FIGS. 5(a)–8(a) are a front view of the target, respectively, and FIGS. 5(b)–8(b) are a sectional view of the same, respectively.

DESCRIPTION OF THE PREFERRED EMBODIMENTS:

Now, the present invention will be described in detail hereinafter with reference to the accompanying drawings which illustrate preferred embodiments of the present invention.

Figure 1A:
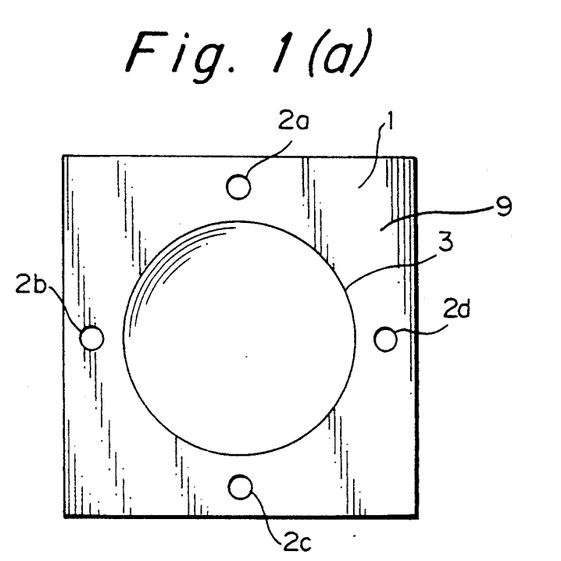
FIG. 1(a) is a front view of the target and FIG. 1(b) is a sectional view of the same.
Figure 1B:
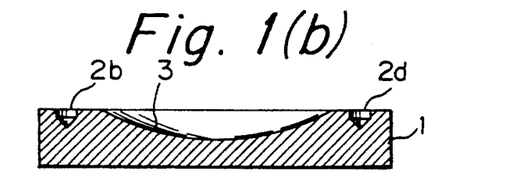

FIGS. 1(a) and 1(b) show the structure of a target employable for three-dimensionally measuring a position and an attitude occupied by an object such as a space craft or the like in accordance with an embodiment of the present invention, respectively, wherein FIG. 1(a) is a front view of the target and FIG. 1(b) is a sectional view of the same. In the drawings, reference numeral 1 designates a target base board and reference numeral 2 designates a mark which generally indicates four positions arranged on a single common plane. According to the shown embodiment, the mark 2 is composed of four corner cube reflectors 2a, 2b, 2c and 2d which are mounted on the target base board 1. Reference numeral 3 designates a spherical reflector which is formed on the target base board 1. As is apparent from the drawings, the spherical reflector 3 serves as a concave mirror.

Figure 2A:
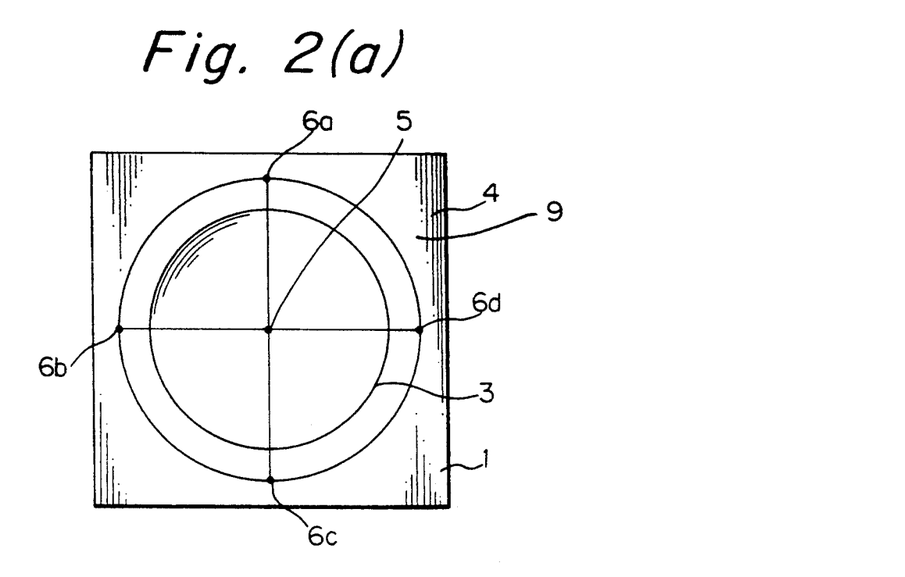
FIG. 2(a) is a front view of the mark and the spherical reflector and FIG. 2(b) is a sectional view of the same.
Figure 2B:
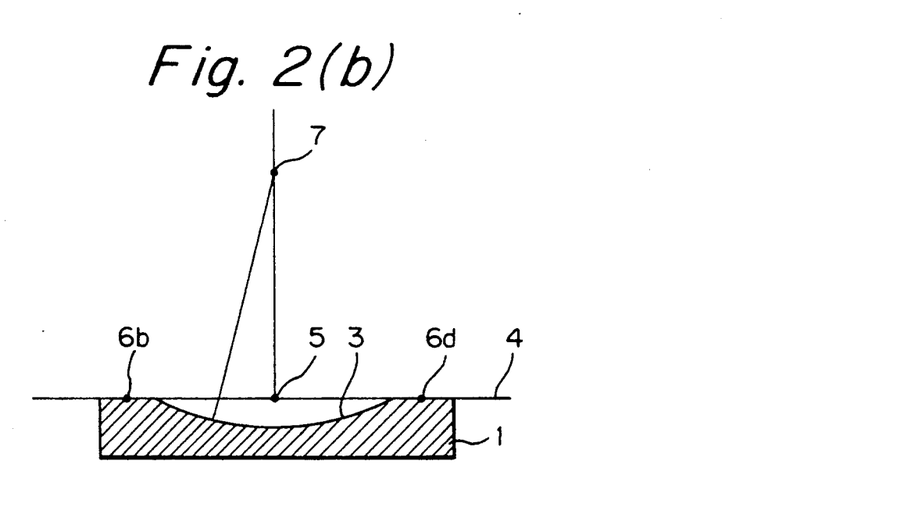

Next, description will be made below as to arrangement of the mark 2, i.e., the corner cube reflectors 2a, 2b, 2c and 2d and the concave mirror 3 with reference to FIGS. 2(a) and 2(b) wherein FIG. 2(a) is a front view of the target 1 and FIG. 2(b) is a sectional view of the same. The corner cube reflectors 2a, 2b, 2c and 2d are arranged on points 6a, 6b, 6c and 6d which correspond to four equally spaced points located on an imaginary plane 4 around the periphery of an imaginary circle of which center is identified by reference numeral 5. The concave mirror 3 is constructed such that a center 7 for the curvature of the concave mirror 3 is located remote from the imaginary plane 4 on an imaginary normal line extending from the center 5 of the imaginary circle at a right angle relative to the imaginary plane 4.

Figure 3:
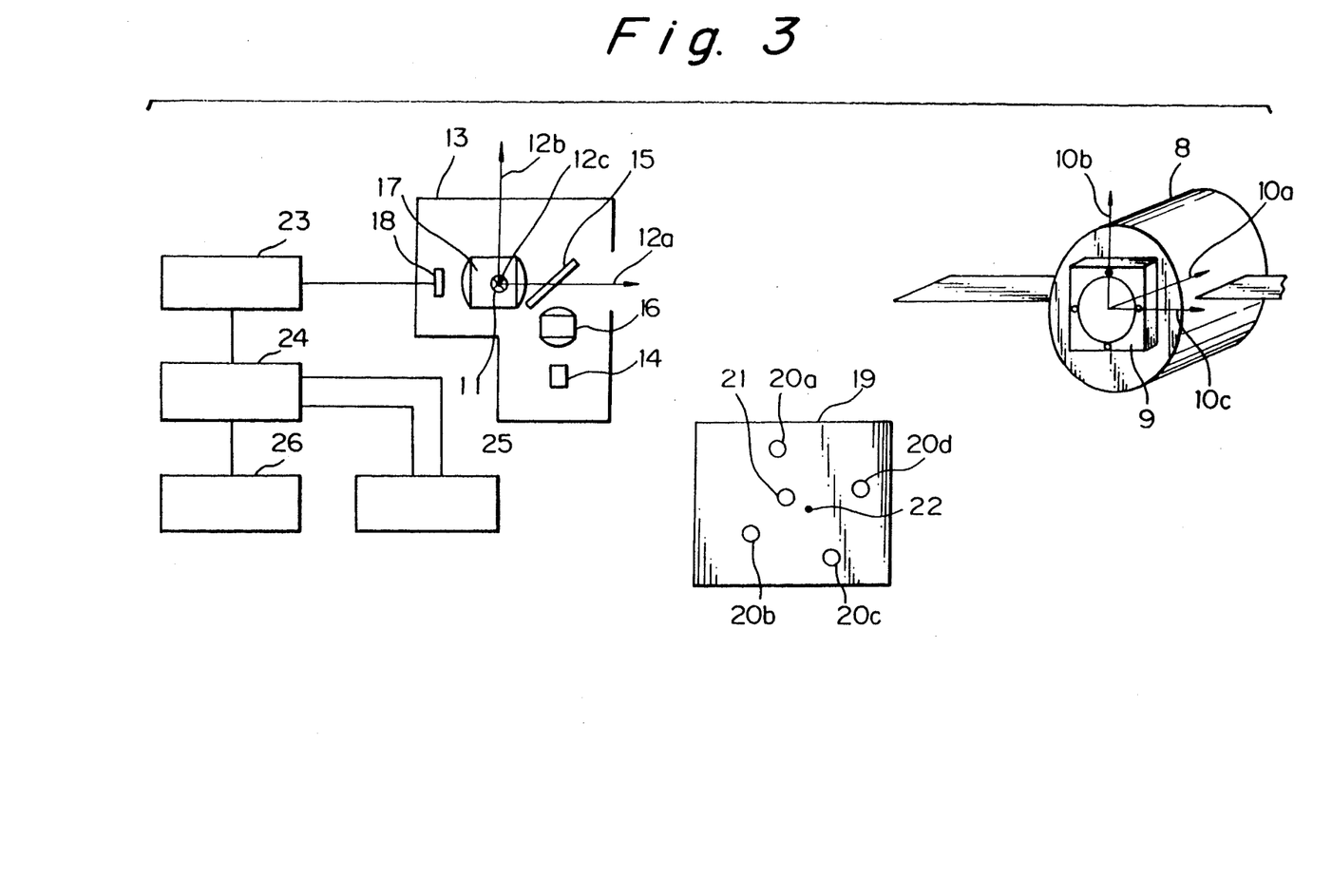
FIG. 3 is an illustrative view which schematically shows the structure of a system for three-dimensionally measuring a position and an attitude assumed by an object such as a space craft or the like in accordance with other embodiment of the present invention.

Next, a system for three-dimensionally measuring a position and an attitude assumed by an object such as a space craft or the like by using the aforementioned target in accordance with another embodiment of the present invention will be described below with reference to FIG. 3. In the drawing, reference numeral 8 designates an object to be measured, reference numeral 9 designates a target which is attached to the object 8 so as to three-dimensionally measure a position and an attitude of the object 8, reference numerals 10a, 10b and 10c designate a coordinate axis in an imaginary target coordinate system arranged on the target 9, respectively, reference numeral 11 designates a measuring point, reference numerals 12a, 12b and 12c designate a coordinate axis in an imaginary reference coordinate system arranged on the measuring point 11, respectively, reference numeral 13 designates a sensor head disposed on the measuring point 11 so as to obtain an image representing the target 9, reference numeral 14 designates a light source which is composed of a semiconductor laser light unit to constitute the sensor head 13, reference numeral 15 designates a half mirror and reference numeral 16 designates a group of lenses. In the shown case, light irradiating means is constituted by the light source 14, the half mirror 15 and the group of lenses 16. In addition, reference numeral 17 designates a group of lenses which serve as image building means constituting the sensor head 13, reference numeral 18 designates a solid photographing element which serves also as an image building means, reference numeral 19 designates an image which is built by the sensor head 13, reference numerals 20a, 20b, 20c and 20d designate an image portion in the form of a bright point which is visually recognized on the image 19, respectively, wherein the images 20a, 20b, 20c and 20d are built by the corner cube reflectors 2a, 2b, 2c and 2d, reference numeral 21 designates an image portion in the form of a bright point which is built by the concave mirror 3, reference numeral 22 designates a position in the image 19 corresponding to the center 5 of the imaginary circle, reference numeral 23 designates a target extracting circuit which serves as a bright point extracting means for extracting from the image 19 the bright point image portions 20a, 20b, 20c and 20d which have been built by the corner cube reflectors 2a, 2b, 2c and 2d as well as the bright point image portion 21 which has been built by the concave mirror 3, reference numeral 24 designates a gravity center position detecting circuit which serves as image portion gravity center coordinate value detecting means for extracting horizontal positions and vertical position in the image 19 corresponding gravity centers of the image portions 20a, 20b, 20c and 20d which have been extracted in the target extracting circuit 23, reference numeral 25 designates a target following circuit for momentarily following the bright points 20a, 20b, 20c and 20d which vary as the object 8 to be measured moves, and reference numeral 26 designates a calculating/processing circuit which serves as a calculating/processing means for performing a calculating/processing operation in accordance with the program which has been previously determined based on the values derived from the image portion gravity center position detecting circuit 24.

Figure 4:
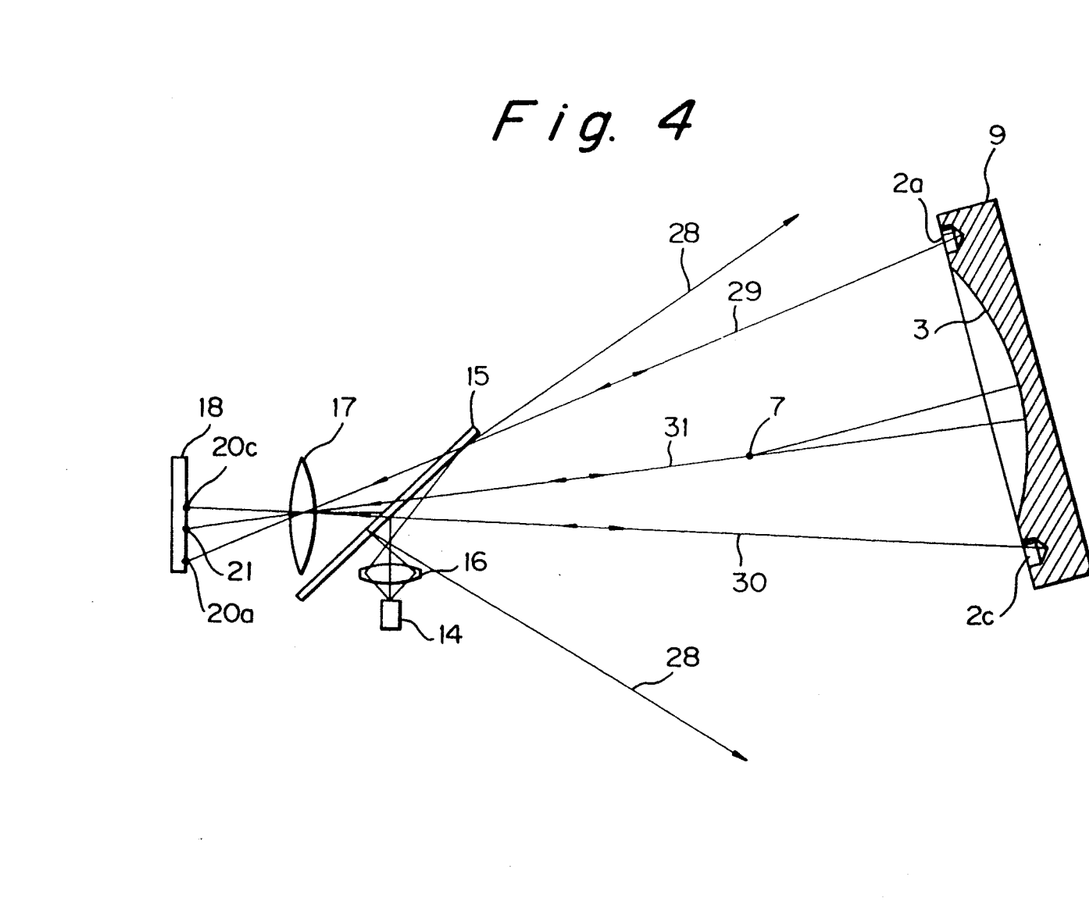
FIG. 4 is an illustrative view which schematically shows a principle for operating the system shown in FIG. 3.

Next, an operation of the system constructed in the aforementioned manner will be described below with reference to FIG. 4. FIG. 4 is an illustrative view which schematically shows a principle for performing a measuring operation with the system of the present invention wherein the sensor head 13 and the target 9 are shown in a sectioned state. As light is generated in the light source 14 in the sensor head 13, the light is transformed into scattered light 28 via the half mirror 15 and the group of lenses 16 and the scattered light 28 is then irradiated toward the target 9. The corner cube reflectors 2a and 2c reflect the scattered light 28 in parallel with incident lights 29 and 30 and the reflected light is then transmitted to the solid photographing element 18 via the group of lenses 17 in the sensor head 13 to build image portions in the form of bright points on the solid photographing element 18, whereby the foregoing image portions are detected as bright points 20a and 20c in the image 19. In addition, the light 31 which has incident on the concave mirror 3 through the center 7 of curvature of the concave mirror 3 based on the relationship between the incident light and the reflected light is reflected from the concave mirror 3 and the reflected light then becomes incident on the sensor head 13 through the center 7 of curvature. Since only the light which has been reflected from the concave mirror 3 forms a bright point 21 on the solid photographing element 18, the bright point 21 in the image 19 correctly corresponds to the position which has been occupied by the center 7 of curvature of the concave mirror 3. In other words, an image portion equivalent to the case where a mark or a position index is arranged on the center 7 of curvature can be obtained with the system of the present invention. In such a manner, the bright points 20a, 20b, 20c and 20d in the image 19 which have been detected by the sensor head 13 correspond to the corner cube reflectors 2a, 2b, 2c and 2d which are arranged on the common plane 4 to serve as marks, while the bright point 21 corresponds to the position which has been occupied by the center 7 of curvature of the concave mirror 3.

Therefore, the system of the present invention makes it possible to three-dimensionally measure a position and an attitude of the object by using the positions which have been occupied by the five bright points 20a, 20b, 20c, 20d and 21 in the image 19 in the same manner as the conventional system.

Since the system of the present invention includes the target following circuit 25, it is possible for the system to constantly detect the bright points 20a, 20b, 20c, 20d and 21 at a high speed after the target has been extracted.

As described above, according to the present invention, since the target has no projecting parts in contrast with the conventional target which has been described above with reference to FIG. 9, such problems that the mark cannot practically be measured due to the danger of a collision with another object, do not arise. Further, since an attitude angle can be measured with enhanced accuracy due to an increase in the radius of curvature of the spherical projector serving as a concave mirror, measurement can be easily accomplished with a high degree of accuracy.

Additionally, since the system of the present invention is constructed such that a light source is used for the sensor head and an optical reflector is employed for the target, it is easy for the system to separate the mark and the bright points on the concave mirror from the background, resulting in measuring accuracy being substantially improved. Even though there arises a case where the attitude of an object to be measured is largely varied and thereby no bright point appears on the concave mirror, the attitude angle of the object can be measured based on the mark composed of four corner cube reflectors arranged on the common plane. Consequently, a measuring operation can be performed with consistently high reliability.

The present invention has been described above with respect to the embodiment wherein four corner cube reflectors are used for the target as a mark and four points are arranged on a single common plane. However, the present invention is not limited to only this embodiment. The present invention may alternatively be applied to a case where many points more than four points are arranged on the common plane to indicate a mark. Further, the present invention may be applied to a case where these points are not equally spaced around the periphery of a common circle.

Figure 5A:
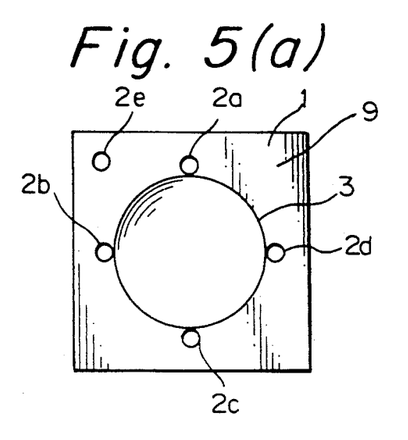
Figure 5B:
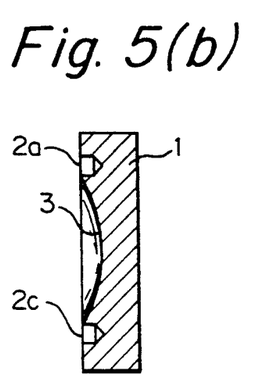
Figure 6A:
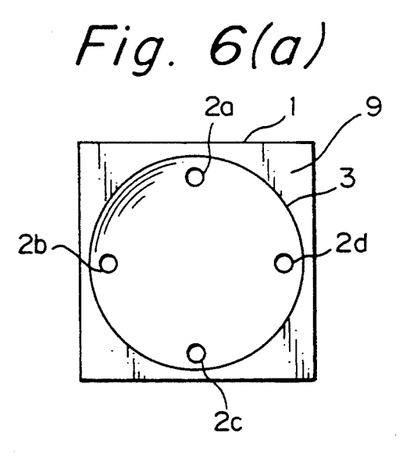
Figure 6B:
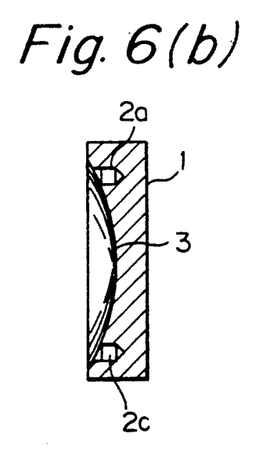
Figure 7A:
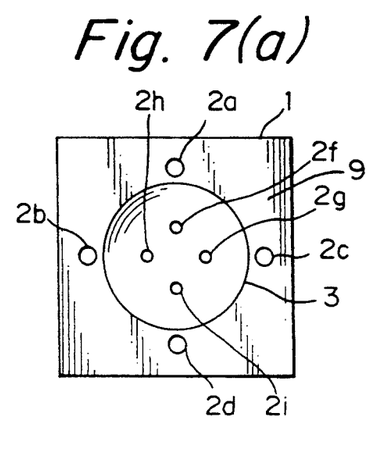
Figure 7B:
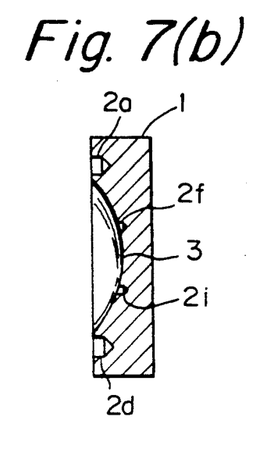

In addition, the positional relationship between the target and the spherical reflector is not limited only to the relationship which has been exemplified in the preceding embodiment of the present invention. For example, modification may be made such that five corner cube reflectors 2a, 2b, 2c, 2d and 2e are arranged as a mark so as to allow the attitude angle of a normal line relative to the target base board 1 to be definitely detected, as shown in FIGS. 5(a) and 5(b) wherein FIG. 5(a) is a front view of the target and FIG. 5(b) is a sectional view of the same. Other modification may be made such that four corner cube reflectors 2a, 2b, 2c and 2d are arranged on the inner spherical surface of a concave mirror 3 serving as a spherical reflector, as shown in FIGS. 6(a) and 6(b) wherein FIG. 6(a) is a front view of the target and FIG. 6(b) is a sectional view of the same. Another modification may be made such that eight corner cube reflectors are arranged on the target, four corner cube reflectors 2f, 2g, 2h and 2i of them being located within the spherical reflector 3, as shown in FIGS. 7(a) and 7(b), wherein FIG. 7(a) is a front view of the target and FIG. 7(b) is a sectional view of the same. With this modification, when the object 8 to be measured comes nearer to the measuring point 11, the object 8 can reliably be detected by at least four corner cube reflectors which are located within the visual range of the sensor head 3.

Figure 8A:
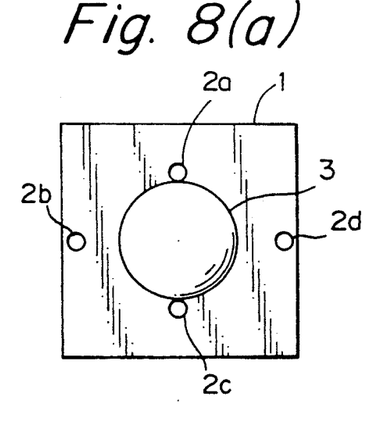
Figure 8B:
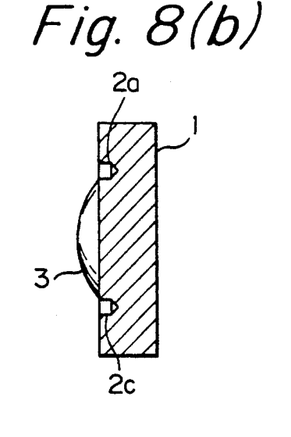

According to the preceding embodiment of the present invention, a concave mirror is employed for the spherical reflector 3 on the target. Alternatively, a convex mirror may be substituted for the concave mirror, as shown in FIGS. 8(a) and 8(b) wherein FIG. 8(a) is a front view of the target and FIG. 8(b) is a sectional view of the same. In this case, the convex mirror may be made of glass, metallic material or a carbon fiber reinforced plastic material or the like.

Further, according to the preceding embodiment of the present invention, a plurality of corner cube reflectors are used for the mark 2. A plurality of cat's eyes may be substituted for the corner cube reflectors. Additionally, a plurality of articles in the form of concave mirrors, convex mirrors or light emitting diodes each adapted to generate light by itself may be employable for the mark. A luminous paint may be used for the corner cube reflectors.

Additionally, according to the preceding embodiment of the present invention, a single sensor head 13 is employed for the system. Alternatively, two or more sensor heads 13 may be employed for the system. In this case, it is obvious that all the five bright points are not required to remain within the visual range of a single sensor head 13. Modification may be made such that the visual range employable for measuring the target 9 is divided into several sections each of which is measured by a corresponding sensor head 13.

To carry out the present invention, a semiconductor laser light unit is employed for the light source 14 for the sensor head 13. A light emitting diode, an incandescent lamp or a halogen lamp may be substituted for the semiconductor laser light unit with the same operative function.

The present invention has been described above with respect to the embodiment wherein the target and the system are employed for space applications. However, the present invention is not limited only to this embodiment. The target and the system are effectively employable for an industrial purpose wherein a position and an attitude occupied by the foremost end of a robot's hand moving with the same effects as those derived from the preceding embodiment of the present invention are to be three-dimensionally measured.

In addition, according to the preceding embodiment of the present invention, light is utilized for detecting the target. Alternatively, modification may be made such that an electromagnetic wave is reflected from the mark and the spherical reflector and another electromagnetic wave is then irradiated toward the same in order to detect them. Another modification may be made such that the mark itself generates an electromagnetic wave.

As is apparent from the above description, according to the present invention, the target employable for three-dimensionally measuring a position and an attitude occupied by an object such as a space craft or the like is composed of a mark for indicating positions of four and more points arranged on a single common plane and a spherical reflector of which the center of curvature is located remote from the common plane. With such a construction, the target has no projection, whereby there does not arise any problem of concealment on collision during a measuring operation as previously mentioned. In addition, since an attitude angle is measured with a higher degree of accuracy as a radius of curvature of the spherical reflector is increased, a measuring operation can be performed with enhanced accuracy.

Further, according to the present invention, the system for three-dimensionally measuring a position and an attitude angle occupied by an object such as a space craft or the like is preferably employable for the aforementioned target. Since the system includes means for allowing the target to be attached to the object to be measured and means for irradiating light toward the target, it is easy for the system to separate the mark and the bright points on the spherical reflector from the background with the result that a measuring operation can be practically performed with enhanced accuracy.

What is claimed is:

1. A target employable for three-dimensionally measuring a position and an attitude occupied by an object from a measuring point remote from said object, said target being attached to said object so as to enable said object to be measured, wherein said target includes a mark embedded in and not extending beyond a surface thereof for indicating fixed positions of four or more different points on a single common plane and a concave spherical reflector of which the center of curvature is located as a position remote from said common plane, and in a fixed positional relationship with said mark, and the concave spherical reflector is embedded in and not extending beyond the surface.

2. The target as claimed in claim 1, wherein said four or more different points on said common plane are equally spaced from each other around the periphery of an imaginary circle which is arranged on said common plane.

3. The target as claimed in claim 1, wherein said spherical reflector comprises a concave mirror.

4. The target as claimed in claim 1, wherein said four or more different points on said common plane are equally spaced away from each other around the periphery of an imaginary circle on said common plane and wherein said spherical reflector comprises a concave mirror of which the center of curvature is located on a normal line extending through the center of said imaginary circle at a right angle relative to said common plane.

5. The target as claimed in claim 1, wherein said mark for indicating four or more different points on a single common plane comprises four corner cube reflectors each adapted to reflect an incident light in parallel with said incident light.

6. A system for enabling a position and an attitude occupied by an object to be three-dimensionally measured from a measuring point remote from said object, wherein said system comprises:

a mark for indicating four or more different points on a single common plane;

a target including a spherical reflector of which the center of curvature is located remote from said common plane;

means for irradiatiang a light toward said target;

image building means for building up an image representing said target;

image photographing means for photographing said image representing said target;

means for extracting from said image representing said target mark image portions representing said mark and a point image portion representing a bright point formed by said spherical reflector;

means for detecting a coordinate value corresponding to the center of gravity of said mark image portions representing said mark and a coordinate value corresponding to the center of gravity of said point image portion representing said bright point; and calculating means for determining in three dimensions said position and said attitude occupied by said object via a series of calculations based on said coordinate values.

7. The system as claimed in claim 6, wherein said mark for indicating four or more different points on a single common plane comprise four corner cube reflectors each adapted to reflect an incident light parallel to said incident light, said spherical reflector comprises a concave mirror, said means for irradiating a light toward said target is a laser light source, said image building means comprises a group of lenses, said image photographing means comprises a solid photographing element, said mark image portions corresponding to said mark representing said target are composed of a plurality of bright points remaining in said image representing said target in correspondence to the positions occupied by said corner cube reflectors, and said point image portion formed by said spherical reflector is a bright point appearing in said image representing said target in correspondence to the position occupied by said center of curvature of said concave mirror.

8. The system as claimed in claim 6, wherein said means for irradiating a light toward said target comprises:

a laser light source.

9. The system as claimed in claim 6, wherein said means for irradiating a light toward said target comprises:

a light emitting diode.

10. The system as claimed in claim 6, wherein said means for irradiating a light toward said target comprises:

an incandescent lamp.

11. The system as claimed in claim 6, wherein said means for irradiating a light toward said target comprises:

a halogen lamp.

12. A target for measuring in three dimensions a position and an attitude occupied by an object from a measuring point remote from said object, wherein said target comprises:

a mark embedded in and not extending beyond a surface of the target, the mark including means defining at least four points disposed respectively at different positions and in a common plane;

and a spherical reflector embedded in and not extending beyond the surface of the target, the spherical reflector having a center of curvature located at a position remote from said common plane.

13. The target as claimed in claim 12, wherein a plurality of said points are disposed on a circular locus.

14. The target as claimed in claim 13, wherein at least one of said points is disposed off of said circular locus.

15. The target as claimed in claim 12, wherein said points are disposed within said spherical reflector.

16. The target as claimed in claim 12, wherein said points are disposed outside of said spherical reflector.

17. The target as claimed in claim 12, wherein said mark comprises:

a first group of said points disposed outside of said spherical reflector; and a second group of said points disposed within said spherical reflector.

18. The target as claimed in claim 12, wherein said mark comprises:

a first group of said points disposed on a circular locus having a first radius; and a second group of said points disposed on a second circular locus having a second radius.

19. The target as claimed in claim 12, wherein said spherical reflector comprises a concave mirror.

20. The target as claimed in claim 12, wherein each said means defining at least 4 points comprising at least 4 cat's eye reflectors for reflecting incident light in parallel with said incident light.

21. The target as claimed in claim 12, wherein each said means defining at least 4 points comprising at least 4 spots of luminous paint.

22. The target as claimed in claim 12, wherein each said means defining at least 4 points, each of which generate an electromagnetic wave.

23. A method of measuring position and attitude of an object from a remote measuring point, comprising the steps of:

providing the object with a target having a mark embedded in and not extending beyond a surface of the target, the mark defining at least four fixed coplanar points and having a concave spherical reflector embedded in and not extending beyond the surface of the target, the spherical reflector having a center of curvature located in a fixed non-coplanar positional relationship with the mark;

illuminating the target;

forming an image of the illuminated target; and calculating position and attitude of the target on the basis of locations in the image of portions corresponding to the mark and the spherical reflector.

24. The method of claim 23, wherein the step of illuminating includes:

irradiating the target with electromagnetic waves.

25. The method of claim 24, wherein the electromagnetic waves are light.

26. The method of claim 23, wherein the step of illuminating includes:

causing the mark to generate electromagnetic waves.

27. The method of claim 26, wherein the electromagnetic waves are light.

28. The method of claim 26, wherein the step of illuminating includes:

irradiating the target with additional electromagnetic waves.

29. The method of claim 28, wherein the electromagnetic waves are light.

30. The method of claim 28, wherein the additional electromagnetic waves are light.

31. A target for measuring in three dimensions a position and an attitude occupied by an object from a measuring point remote from said object, wherein said target comprises:
- a mark including means defining at least four points disposed respectively at different positions and in a common plane; and
- a spherical reflector having a center of curvature located at a position remote from said common plane;

said mark including,
- a first group of said points disposed outside of said spherical reflector; and
- a second group of said points disposed within said spherical reflector.

32. A target for measuring in three dimensions a position and an attitude occupied by an object from a measuring point remote from said object, wherein said target comprises:
- a mark including means defining at least four points disposed respectively at different positions and in a common plane, embedded in the target and not extending beyond a surface thereof; and
- a spherical reflector having a center of curvature located at a position remote from said common plane, embedded in the target and not extending beyond a surface thereof;

said mark including,
- a first group of said points disposed on a circular locus having a first radius; and
- a second group of said points disposed on a second circular locus having a second radius.

33. A target for indicating a position and an attitude of an object to a measuring device remote from the object, the target comprising:
- a body;
- at least four distinct and all spacedly disposed means connected to the body, embedded in and not extending beyond a surface thereof, each of the at least four means for indicating a location to the measuring device, and the indicated locations defining a single common plane; and
- a concave spherical reflector connected to the body, embedded in and not extending beyond a surface thereof, and having a center of curvature disposed at a fixed location remote from the single common plane.

34. A target as defined in claim 33, wherein the concave spherical reflector is formed by a concave spherical surface defined in the body.

35. A target as defined in claim 34, wherein the body includes holes for receiving the at least four distinct means for indicating, a plurality of the holes disposed outside of the concave spherical reflector surface.

36. A target as defined in claim 34, wherein the body includes holes for receiving the at least four distinct means for indicating, the holes disposed within the concave spherical reflector surface.

37. A target as defined in one of claims 35 or 36, wherein at least three of the holes are disposed on a circular locus.

38. A target as defined in claim 37, wherein at least one of the holes are disposed off the circular locus.

39. A target as defined in claim 35, wherein a plurality of the holes are disposed within the concave spherical reflector.

40. A target as defined in claim 33, wherein each of the at least four distinct means for indicating generates an electromagnetic wave.

41. A target as defined in claim 40, wherein the at least four distinct means for indicating comprise:
spots of luminous paint.

42. A target as defined in claim 33, wherein the at least four distinct means for indicating comprise:
corner cube reflectors.

* * * * *